Figure 1:
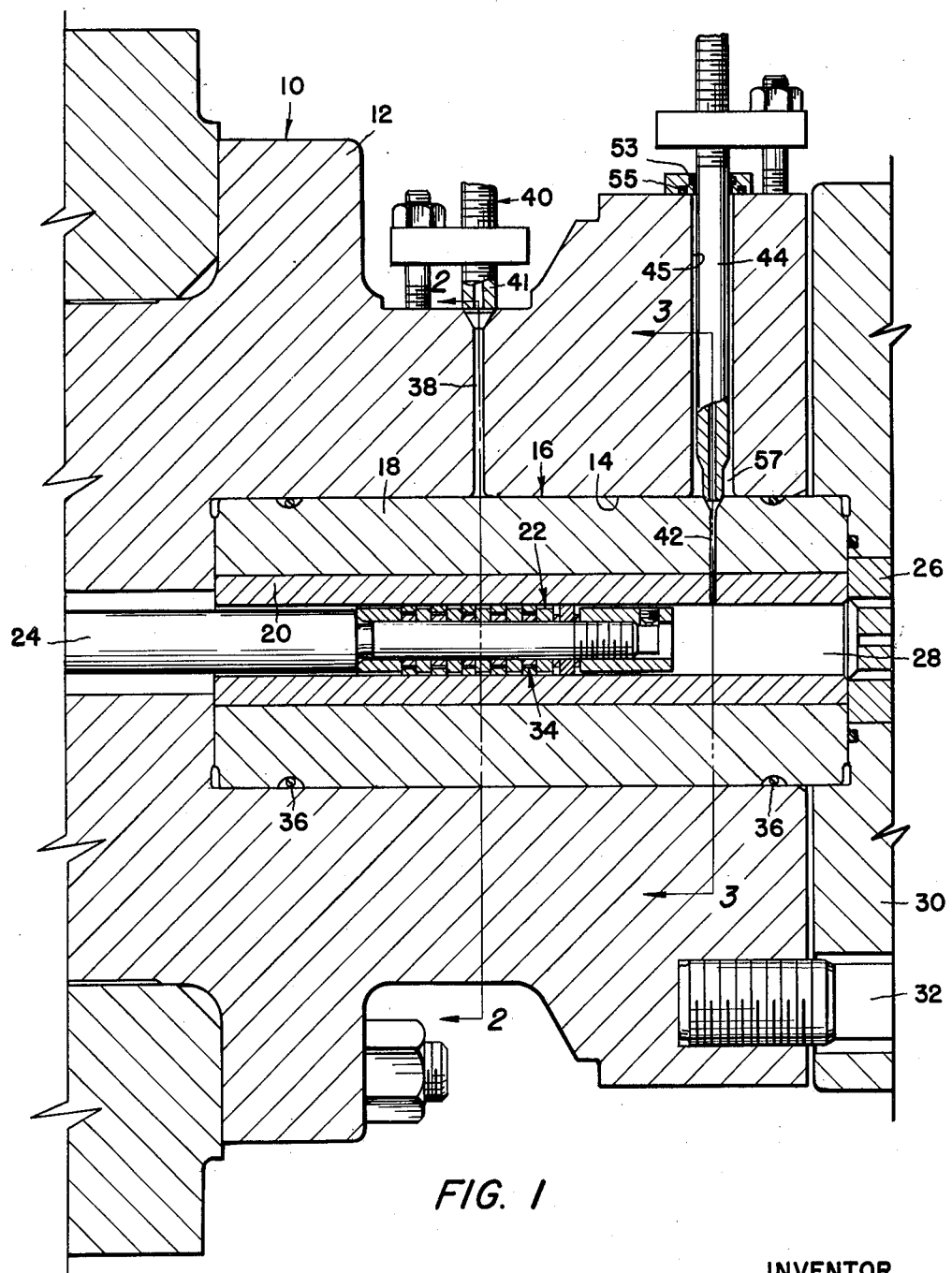

INVENTOR
ANTHONY J. WAIBEL
BY
HIS ATTORNEY

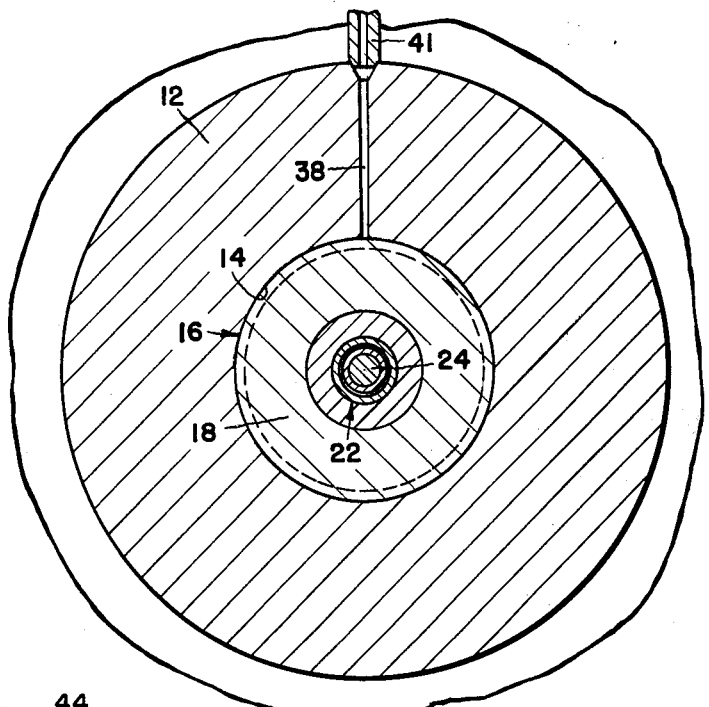
FIG. 2
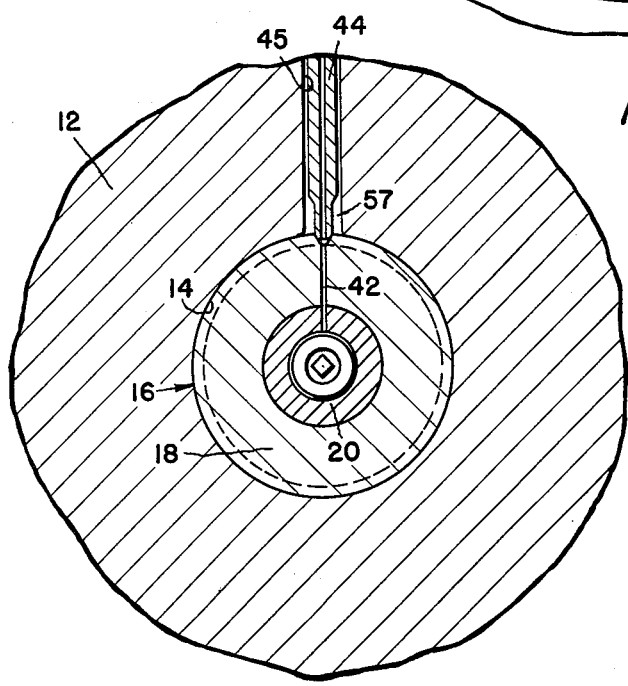
FIG. 3
INVENTOR
ANTHONY J. WAIBEL
BY 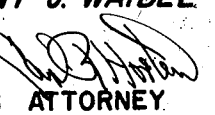
HIS ATTORNEY April 14, 1964 A. J. WAIBEL 3,128,941
CYLINDER ARRANGEMENT FOR HIGH PRESSURE COMPRESSORS
Filed Oct. 27, 1960 4 Sheets-Sheet 4

INVENTOR
ANTHONY J. WAIBEL
BY
HIS ATTORNEY

United States Patent Office 3,128,941
Patented Apr. 14, 1964

3,128,941
CYLINDER ARRANGEMENT FOR HIGH
PRESSURE COMPRESSORS
Anthony J. Waibel, Painted Post, N.Y., assignor to Ingersoll-Rand Company, New York, N.Y., a corporation of New Jersey
Filed Oct. 27, 1960, Ser. No. 65,360
1 Claim. (Cl. 230—206)

This invention relates to compressors in general and more particularly to high pressure compressors.

In high pressure compressors of the commonly known type the cylinder is subjected to substantially high internal pressure. Due to the high cyclic internal loads with every working stroke of the piston of the compressor, the pressure on the exterior of the cylinder being substantially equal to atmospheric pressure, the cylinder is subjected to repeated stresses of high magnitude. This leads to early fatigue and failure of the cylinder material, as referred to in patent application Serial No. 38,814, filed June 27, 1960, now Patent No. 3,077,899.

Another common problem with high pressure compressors is the proper positioning of the lubricant supply to the cylinder, and several unsuccessful attempts have been made to supply the lubricant directly into the liner bore areas of friction between the cylinder and the piston by means of a passage through the wall of the liner at such areas. While this location is most desirable the liner fails due to the aforementioned cyclic internal loads. When drilling a lubricant passage through the cylinder or liner wall at the aforementioned areas the stress concentration at such passage causes the cylinder or liner material to fail within a short period of time resulting in delay of operations and expensive repairs or replacements. The lubricant supply is therefore usually located in a member adjacent to the cylinder, this member being of composite construction, namely, an outer ring shrunk on an inner ring to cause the inner ring to be subjected to compression in order to decrease the material fatigue limit. In some cases the lubricant is introduced into the cylinder or liner by means of the inlet, this to attempt to eliminate cylinder failures, however, the life of the piston rings and liner is then considerably shortened. These arrangements do not provide a solution for the problem of positioning the lubricant supply in the proper areas for effective lubrication of the cylinder and piston.

An object of this invention is to provide a high pressure compressor cylinder assembly of simplified structure as compared to the presently known high pressure compressor cylinder assemblies.

Another object of this invention is to provide a high pressure compressor cylinder assembly which is economical to manufacture as compared to the manufacture of presently known high pressure compressor cylinder assemblies.

Yet another object of this invention is to provide a high pressure compressor cylinder assembly in which the causes of failure and fatigue of the cylinder material are substantially eliminated.

Still another object of this invention is to provide a high pressure compressor cylinder assembly in which the lubricant supply is conducted into the cylinder at the friction areas between the piston and the cylinder wall for effective lubrication of such areas.

Yet another object of this invention is to provide a high pressure compressor cylinder assembly in which the life of the lubricant conduit is substantially increased.

Yet another object of this invention is to provide a high pressure compressor cylinder assembly in which the life of the cylinder assembly is substantially increased.

Another object of this invention is to provide a high pressure compressor cylinder assembly of such structure that will facilitate maintenance procedures.

Other objects will become apparent from the following description and accompanying drawings which illustrate a preferred embodiment of the invention and in which similar numerals refer to similar parts.

Figure 4:
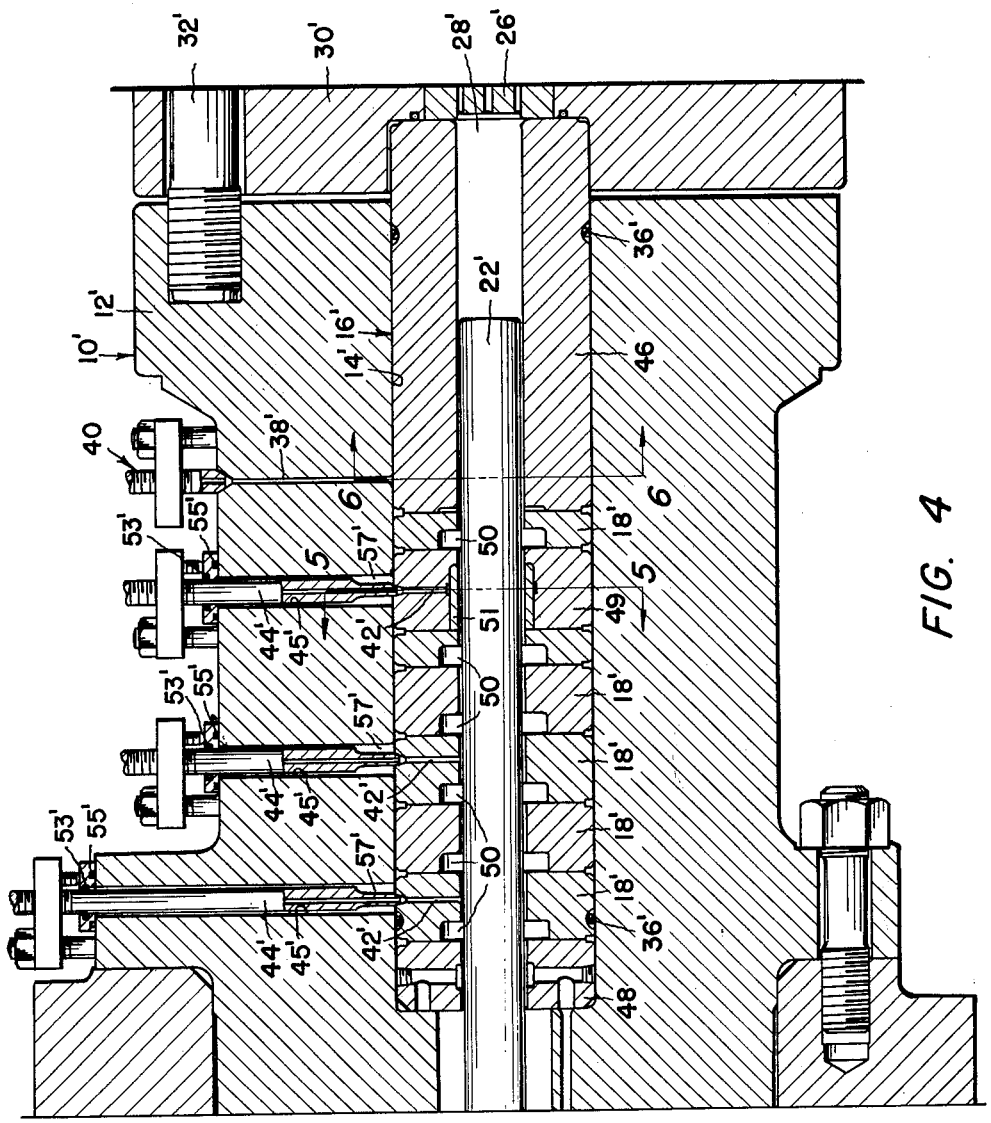
Figure 5:
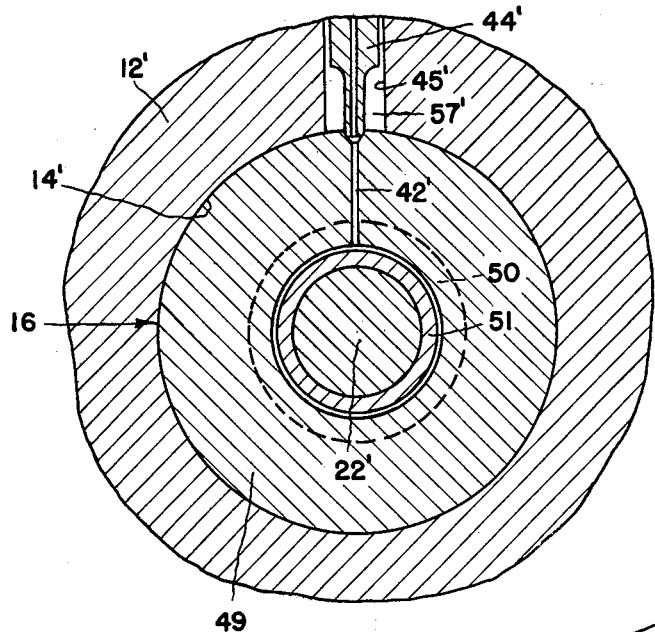
Figure 6:
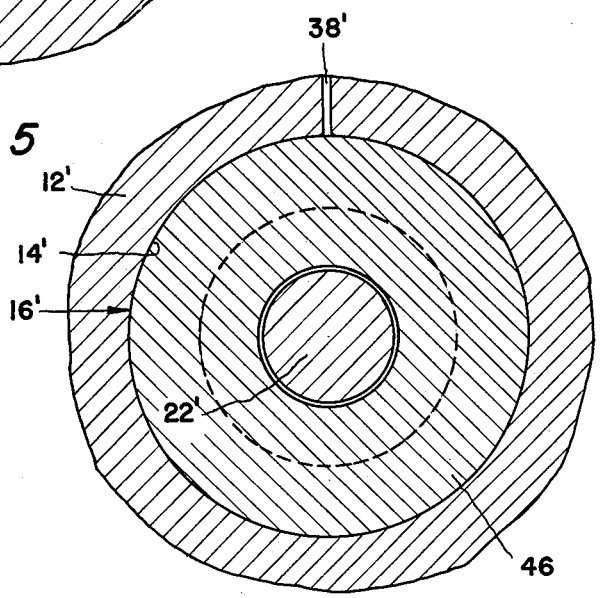

FIGURE 1 shows a longitudinal sectional view of a portion of a high pressure compressor embodying this invention, FIG. 2 is a cross sectional view taken along the line 2—2 of FIG. 1 and looking in the direction of the arrows, FIG. 3 is a cross sectional view taken along the line 3—3 of FIG. 1 and looking in the direction of the arrows, FIG. 4 is a longitudinal sectional view of a portion of a high pressure compressor showing another embodiment of this invention, FIG. 5 is a cross sectional view taken along the line 5—5 of FIG. 4 and looking in the direction of the arrows, and FIG. 6 is a cross sectional view taken along the line 6—6 of FIG. 4 and looking in the direction of the arrows.

Referring now to the drawings, FIGURES 1, 2 and 3 illustrate a preferred embodiment of the invention in which 10 designates a high pressure compressor (partly shown) having a casing 12 in which is provided a bore 14. In bore 14 is formed a cylinder 16 comprising a tubular member 18 within which is shrink fitted a wear sleeve or liner 20 of preferably very high wear resistance material. A piston 22, connected to a piston rod 24, is provided within cylinder 16 to reciprocate and compress fluid in the forward end portion of cylinder 16. A sealing arrangement 34 of a commonly known type for piston 22 prevents fluid from flowing rearwardly from the forward end portion of cylinder 16.

A high pressure valve assembly 26 (partly shown), preferably of a type as disclosed in patent application Serial No. 38,814, filed June 27, 1960, is positioned at the forward end of cylinder 16 to control the intake as well as the discharge of fluid before and after compression into and from cylinder 16 in a commonly known manner. The intake into cylinder 16 and the discharge from cylinder 16 takes place through the open forward end 28 of cylinder 16. High pressure valve assembly 26 (partly shown) and cylinder 16 are held in place by cylinder head 30 (partly shown) which is connected to casing 12 by stud bolts 32 (only one shown).

It is to be noted that cylinder 16 is disposed within bore 14 such that there is provided a clearance between the outer periphery of cylinder 16 and the inner periphery of bore 14. In accordance with this invention fluid under pressure substantially equal to the pressure in the forward end portion or discharge 28 of cylinder 16 is conducted to such clearance and to the outer periphery of cylinder 16 to cause cylinder 16 to be subjected to compression. This is achieved by providing communication between discharge 28 of cylinder 16 with the clearance between the outer periphery of cylinder 16 and the inner periphery of bore 14 by means of a conduit 40 (partly shown). Conduit 40 has one end (not shown) communicating with discharge 28 and the other end 41 communicating with a passage 38 extending through the wall of casing 12 and opening into bore 14. Seals 36 are provided to prevent the escape of fluid from the aforementioned clearance and to maintain the pressure of the fluid in such clearance at a pressure substantially equal to the discharge pressure in discharge 28. In this manner then cylinder 16 is constantly subjected to external pressure or compression while the internal pressure of cylinder 16 is varied with every stroke of the piston of the compressor. With the provision of conducting fluid under pressure to the clearance between the outer periphery of cylinder 16 and the inner periphery of bore 14, causing cylinder 16 to be subjected to compression or external pressure, an additional purpose is served, that of causing the casing 12 to be subjected to a constant internal pressure. This is of prime importance since a fluctuating or cyclic pressure against the inner periphery of bore 14 causes repeated deformation and leads to early fatigue and failure of the cylinder casing material. This invention achieves a cylinder arrangement for high compression compressors which is stronger, more reliable, and more economical to manufacture when compared to the presently known types of high compression compressors.

Referring to the proper positioning of the supply of lubricant to the inner periphery of wear sleeve 20 at a location most desirable for effective lubrication of the friction area between piston 22 and wear sleeve 20, a passage 42 is drilled through the walls of member 18 and wear sleeve 20. Heretofore a passage through the cylinder wall would cause the cylinder material to fail within a short time due to the stress concentration at such passage. Passage 42 is connected with a supply of lubricant (not shown) by means of a conduit 44 (partly shown) inserted in a passage 45 through the wall of casing 12 and held in place in a commonly known manner. Pressure seals 53 and 55 are provided to prevent communication of the clearance 57 between the inner periphery of passage 45 and the outer periphery of conduit 44 with the atmosphere.

As shown in FIGS. 1 and 3 clearance 57 is in communication with the clearance between the inner periphery of bore 14 and the outer periphery of cylinder 16, such communication permitting fluid to flow freely from the clearance between the inner periphery of bore 14 and the outer periphery of cylinder 16 into clearance 57 to constantly subject conduit 44 to compression as referred to hereinbefore in connection with cylinder 16. As the lubricant is supplied through conduit 44 to the interior of cylinder 16 at a pressure of at least as high as the discharge pressure at discharge 28 the conduit 44 is subjected to internal pressure and stresses of high magnitude, and it is then clear that with this arrangement a lubricant supply conduit is provided which is stronger, more reliable and more economical to manufacture as compared to the arrangement used in presently known types of high compression compressors. The invention of constantly subjecting cylinder 16 to compression as hereinbefore described thus also improves and simplifies the lubricant supply for the friction area between the piston and the cylinder.

FIGS. 4, 5 and 6 show another embodiment of this invention to clearly illustrate the advantage of the aforementioned feature of external pressure or compression with respect to the cylinder when applied to a cylinder type of composite construction packing cups. In presently known cylinder structures for high pressure compressors, when using packing cups of composite construction, each packing cup comprises an outer ring shrunk on an inner ring to place the inner ring in compression. Such cups are of substantially large diameter because of the repeated high magnitude stresses in the material of such cups with each working stroke of the piston of the compressor. This invention, however, permits a cup construction of considerably less diameter, simpler in structure, stronger and more reliable than heretofore experienced.

This compressor type, according to this invention, comprises a casing 12' provided with a bore 14' in which a cylinder 16' is disposed. Cylinder 16' comprises end members 46 and 48, and packing cups 18' placed between end members 46 and 48 and clamped therebetween by a clyinder head 30' fastened to casing 12' by stud bolts 32' (only one shown). An intermediate member 49 carrying a wear sleeve 51, preferably of bronze, is positioned between two packing cups 18'. Each packing cup is provided with a recess 50 in which metallic type packing rings (not shown) are disposed to prevent rearward flow of fluid from the forward end portion of cylinder 16'.

Fluid is admitted to and discharged from the forward end portion of cylinder 16' through the open end 28' of cylinder 16', and a valve assembly 26' (partly shown) controls the flow to and from cylinder 16' in a commonly known manner.

A passage 38' is drilled through the wall of casing 12' opening into bore 14' and into a clearance provided between the outer periphery of cylinder 16' and the inner periphery of bore 14. The feature of subjecting cylinder 16' to compression is achieved by communicating passage 38' with the discharge 28' of cylinder 16' by means of conduit 40' (partly shown) such that fluid at a pressure substantially equal to the discharge pressure in discharge 28' is conducted to the outer periphery of cylinder 16' as referred to in the preceding description of FIGS. 1, 2 and 3. Seals 36' are provided to prevent the escape of fluid from the aforementioned clearance and to maintain the pressure of the fluid in such clearance at a pressure substantially equal to the discharge pressure in discharge 28.

A lubricant supply for effectively lubricating the friction areas between the cylinder and piston is provided by drilling passages 42' through a number of packing cups 18' and through intermediate member 49, and connecting such passages 42' with a supply of lubricant (not shown) by means of conduits 44' (partly shown). For each conduit 44' is provided a passage 45' through the wall of casing 12', conduits 44' being held in place in a commonly known manner. A clearance 57' is formed between the outer periphery of each conduit 44' and the inner periphery of each passage 45', each clearance 57' being in communication with the clearance between the inner periphery of bore 14' and the outer periphery of cylinder 16'. Pressure seals 53' and 55' are provided for each conduit 44' to prevent communication of clearances 57' with the atmosphere. This arrangement causes each conduit 44' to be constantly subjected to compression with the advantages as disclosed in connection with conduit 44 of FIGS. 1, 2 and 3.

With the arrangement of subjecting cylinder 16' to compression, the structure of the cylinder arrangement shown in FIGS. 4, 5 and 6 is substantially simplified compared with the commonly known cylinder arrangement of the packing cup type high pressure compressors. As shown in FIGS. 4, 5 and 6, this invention eliminates the use of an outer ring shrunk on an inner ring type composite construction packing cup as hereinbefore described and permits the use of a single ring type packing cup of simplified structure to produce a high pressure compressor that is strong, reliable, effective and economical to manufacture.

While I have shown and described specific forms of this invention, it is to be understood that various changes and modifications may be made without departing from the spirit of the invention as set forth in the appended claim.

I claim:

In a compressor, a casing having a bore, means to form a cylinder in said bore, a reciprocatory piston in said cylinder to be actuated to compress fluid in said cylinder, said cylinder having a discharge for the conductance of fluid after compression, a passage in the casing wall leading to the inner periphery of said bore for the conductance of fluid, means to conduct fluid from said discharge into said passage and to between the outer periphery of said cylinder and to the associated periphery of said bore to cause said cylinder to be subjected to external compression, means to maintain the pressure of the fluid between the outer periphery of said cylinder and the associated periphery of said bore constant, a lubricant supply for said compressor, at least one second passage in said casing wall comprising a first portion having a circular cross section extending through the casing wall to the inner periphery of said bore for communicating said bore with said first portion, and a second portion of said second passage having a circular cross section extending in axial alignment with said first portion through the wall of said cylinder for the conductance of lubricant, a conduit disposed to be in communication with said second portion of said second passage and held in said first portion of said second passage such that the inner end of said conduit is held in sealing relation with the opposing end of said second portion of said second passage to prevent communication between the interior and the exterior of said conduit, means to prevent communication between the atmosphere and the interior of said first portion of said second passage, and means to conduct lubricant from said lubricant supply to flow through said conduit and said second portion of said second passage into the interior of said cylinder.

References Cited in the file of this patent

UNITED STATES PATENTS

| | | |
|---|---|---|
| 1,133,270 | Dale | Mar. 30, 1915 |
| 1,260,100 | Udell | Mar. 19, 1918 |
| 1,743,584 | Wiltse | Jan. 14, 1930 |
| 2,235,070 | Giern et al. | Mar. 18, 1941 |
| 2,250,164 | Minder | July 22, 1941 |
| 2,496,547 | Lankford | Feb. 7, 1950 |
| 2,730,960 | Krause | Jan. 17, 1956 |
| 2,832,653 | Wilson | Apr. 29, 1958 |

FOREIGN PATENTS

| | | |
|---|---|---|
| 498,084 | Belgium | Sept. 30, 1950 |